United States Patent [19]
Herrick et al.

[11]  4,268,405
[45]  May 19, 1981

[54] METHOD FOR FORMING GLAUBER'S SALT CRYSTALS WITH REDUCED ENCAPSULATION BY THE ADDITION OF ETHYLENE GLYCOL MONOBUTYL ETHER

[75] Inventors: Carlyle S. Herrick, Alplaus; Kenneth P. Zarnoch, Clifton Park, both of N.Y.

[73] Assignee: General Electric Company, Schenectady, N.Y.

[21] Appl. No.: 63,372

[22] Filed: Aug. 3, 1979

[51] Int. Cl.³ .............................................. C09K 5/06
[52] U.S. Cl. ...................................... 252/70; 126/400
[58] Field of Search ........................... 252/70; 126/400

[56] References Cited

U.S. PATENT DOCUMENTS

| | | | |
|---|---|---|---|
| 4,152,899 | 5/1979 | Herrick | 62/4 |
| 4,154,292 | 5/1979 | Herrick | 165/1 |
| 4,209,312 | 6/1980 | Herrick | 62/4 |

OTHER PUBLICATIONS

Hodgins et al., "The Storage and Transfer of Low Potential Heat," Canadian Journal of Technology, vol. 33, pp. 293–302, 1955.

Whillier, "Letter to the Editor," The Sun at Work, vol. 2, p. 2, Jun. 1957.

Telkes, "Solar Heat Storage," ASME Paper 64, WA-Sol-9, 1964.

*Primary Examiner*—Harris A. Pitlick
*Attorney, Agent, or Firm*—David C. Faulkner; James C. Davis, Jr.; Joseph T. Cohen

[57]  ABSTRACT

Encapsulation of $Na_2SO_4$ particles by Glauber's salt crystals formed by crystallization of $Na_2SO_4$ from aqueous solution in systems comprising $Na_2SO_4$, $H_2O$ and Glauber's salt is decreased by including ethylene glycol monobutyl ether in the system.

6 Claims, No Drawings

METHOD FOR FORMING GLAUBER'S SALT CRYSTALS WITH REDUCED ENCAPSULATION BY THE ADDITION OF ETHYLENE GLYCOL MONOBUTYL ETHER

BACKGROUND OF THE INVENTION

This invention relates to improved utilization of crystals of $Na_2SO_4 \cdot 10H_2O$ (Glauber's salt) as a liquid-solid phase change material in storage of thermal energy.

The invention is particularly applicable to the utilization of Glauber's salt as the solid form of a L-S P-C material in a thermal energy storage device, which imparts interparticle motion to crystals in the chemical system comprising $Na_2SO_4$ (sodium sulfate), water, and Glauber's salt.

Methods are known for storing thermal energy in and retrieving thermal energy from a liquid-solid phase-change (L-S P-C) material, for which sodium sulfate decahydrate in the solid form, wherein such material is maintained in a container and fluid is circulated over the outer surface thereof to effectuate heat exchange between the fluid and the L-S P-C material. A method and device of the foregoing types are described by Herrick in U.S. Pat. No. 4,154,292, which is incorporated herein by reference. As described therein with reference to the device (referred to therein as a "heat exchange device"), a liquid-solid phase-change material is sealed in a container, which is slowly rotated about a generally horizontal axis at a substantially constant rotational speed. For brevity, such device is referred to as a "rolling cylinder."

A problem encountered with utilization of Glauber's salt in the cycled storage of thermal energy is that the latter salt physically encapsulates $Na_2SO_4$ (sodium sulfate) during the freezing mode, i.e., during removal of thermal energy or heat from the chemical system. As used herein, the term "cycled storage" means the cycle comprising the steps of introducing thermal energy into and removal thereof from a L-S P-C material. In the chemical system comprising $Na_2SO_4$, $H_2O$ and $Na_2SO_4 \cdot 10H_2O$ the resulting encapsulation by Glauber's salt of $Na_2SO_4$ decreases the rate of dissolution thereof in the liquid phase. Such dissolution is required for continuation of formation of Glauber's salt crystals from the $Na_2SO_4$ and water components of the system. As is well known to those skilled in the art, Glauber's salt is formed by crystallization of $Na_2SO_4$ from aqueous solution. Thus, the aforementioned dissolution of $Na_2SO_4$ is a prerequisite to maximizing the amount of Glauber's salt crystals which can be formed from (and concomitant release of heat for) a given amount of $Na_2SO_4$.

The rate of requisite dissolution of the encapsulated $Na_2SO_4$ decreases with increasing thickness of the encapsulating Glauber's salt wall and increases with decreasing thickness thereof. As a corollary, the resistance to diffusion or other movement of $Na_2SO_4$ through the encapsulating wall to the surrounding solubilizing aqueous liquid increases with increasing wall thickness and decreases with decreasing thickness thereof. As an overall result, such encapsulation decreases the rate of crystallization.

One approach to overcoming the foregoing problem is described by Herrick in U.S. patent application Ser. No. 706,895, filed Feb. 23, 1976 now U.S. Pat. No. 4,209,312 and incorporated herein by reference. Briefly stated, that approach includes addition of ferric ions with the goal of preventing the growth of large crystals.

It has now been found, by practice of the present invention, that encapsulation of $Na_2SO_4$ particles by Glauber's salt crystals formed by crystallization of $Na_2SO_4$ from aqueous solution in systems comprising $Na_2SO_4$, $H_2O$ and Glauber's salt is decreased by including ethylene glycol monobutyl ether, (also known as butyl Cellosolve, manufactured by Union Carbide Corporation, as disclosed in *The Condensed Chemical Dictionary*, Ninth Edition, page 174 Van Nostrand Reinhold Company, 1977, and hereinafter identified as "butyl Cellosolve" or "B.C.") in the system. That is, such inclusion effects at least a reduction in the average thickness of the encapsulating Glauber's salt wall. It has further now been found that decreasing the average thickness of the encapsulating wall in this manner advantageously results in increasing the rate, extent, or both rate and extend of Glauber's salt crystal formation and increasing the heat flux during the freezing mode.

DESCRIPTION OF THE INVENTION

Generally stated, the present invention provides an improvement in the above method. The improvement comprises including butyl Cellosolve in admixture with the phase-change material in the container, i.e., including butyl Cellosolve as a component of the phase-change system. Butyl Cellosolve is included in an amount effective to effect at least a decrease in average thickness of the $Na_2SO_4$-encapsulating wall of sodium sulfate decahydrate crystals relative to the average thickness of the $Na_2SO_4$-encapsulating wall thereof which would be formed in the absence of butyl cellosolve. The container is subjected to motion which will induce interparticle-motion of crystals present in the phase-change material.

The present invention will be more fully understood by referring to the following detailed description.

DETAILED DESCRIPTION OF THE INVENTION AND MANNER AND PROCESS OF MAKING AND USING IT

In using an embodiment of the heat exchange device described in the above-referenced U.S. Pat. No. 4,154,292 with a system comprising sodium sulfate, water and Glauber's salt sealed in a cylinder disposed horizontally and slowly rotated about its central axis, experience has shown that anhydrous sodium sulfate $(Na_2SO_4)$ particles become encapsulated in solid $Na_2SO_4 \cdot 10H_2O$ during the freezing cycle.

In accordance with the present invention, butyl Cellosolve is included in admixture with the phase-change material in the container. Inclusion of butyl Cellosolve is in an amount thereof effective to effect at least a decrease in average thickness of the $Na_2SO_4$-encapsulating wall of sodium sulfate decahydrate crystals relative to the average thickness of the encapsulating wall thereof which would be formed in the same system except in the absence of the butyl Cellosolve. Advantageous results of including butyl Cellosolve include at lease substantial reduction of both the thickness of the encapsulating wall of Glauber's salt about the $Na_2SO_4$ particles and the time for completing the liquid-to-solid phase change (by virtue of increasing the heat flux during the freezing mode).

The butyl cellosolve component of the system may be butyl cellosolve per se or a paint formulation (e.g., epoxy paint—preferably partially cured) including butyl cellosolve as a solvent, carrier, or the like.

In general, from about 0.01 to about 10 parts by weight of butyl Cellosolve per 100 parts by weight of the phase-change material is effective for decreasing the thickness of the encapsulating wall of Glauber's salt crystals as described above.

Practice of the present invention is further illustrated by the following illustrative and non-limiting example.

EXAMPLE

To a system of $Na_2SO_4$, $H_2O$ and Glauber's salt containing the $H_2O$ and $Na_2SO_4$ in the stoichiometric amount thereof for formation of Glauber's salt was added butyl Cellosolve (B.C) in an amount corresponding to about 1.2 part by weight B.C. per 100 parts total weight of the above-indicated components of the system. When run through a cycled storage of thermal energy in accordance with the teachings of the above-referenced U.S. Pat. No. 4,154,292, the average thickness of the $Na_2SO_4$-encapsulating wall of Glauber's salt was substantially decreased relative to the average thickness thereof usually obtained in the absence of the butyl-Cellosolve. Quantitative calorimetric tests showed that the freezing-mode heat flux was about 200 BTU/hour per square foot of the metal wall of the approximately 1.3-gallon rolling cylinder employed. Such heat flux is approximately double that usually obtained with the same conditions except in the absence of butyl Cellosolve.

Best Mode Contemplated

The best mode contemplated at the time of executing this patent application for practicing the invention is set forth in the above detailed description, especially in the example.

It is understood that the foregoing detailed description is given merely by way of illustration and that many variations may be made therein without departing from the spirit or scope of the present invention.

What is claimed is:

1. In the method of storing thermal energy in and retrieving thermal energy from a liquid-solid phase-change material for which sodium sulfate decahydrate is the solid form, wherein said phase-change material is maintained in a container and fluid is circulated over the outer surface of said container to effectuate heat exchange between said fluid and said material, the improvement comprising the steps of:

(A) including ethylene glycol monobutyl ether in admixture with said phase-change material in said container, said ethylene glycol monobutyl ether being included in an amount effective to effect at least a decrease in average thickness of the $Na_2SO_4$-encapsulating wall of sodium sulfate decahydrate crystals relative to the average thickness of the $Na_2SO_4$-encapsulating wall thereof which would be formed in the absence of ethylene glycol monobutyl ether, and (B) subjecting said container to motion which will induce interparticle-motion of crystals present in said phase-change material.

2. The improved method of claim 1, wherein said amount is sufficient to effect such decrease so that the heat flux is increased during the freezing mode which accompanies the retrieval of thermal energy from said phase-change material.

3. The improved method of claim 1, wherein said amount is sufficient to effect a substantial decrease in said average thickness.

4. The improved method of claim 1, wherein said amount of ethylene glycol monobutyl ether is from about 0.01 to about 10 parts by weight per 100 parts by weight of said phase-change material.

5. A liquid-solid phase-change mixture comprising sodium sulfate decahydrate and ethylene glycol monobutyl ether, the latter being included in an amount effective to effect at least a decrease in average thickness of the $Na_2SO_4$-encapsulating wall of sodium sulfate decahydrate crystals relative to the average thickness of the $Na_2SO_4$-encapsulating wall thereof which would be formed in the absence of ethylene glycol monobutyl ether.

6. The mixture of claim 7, wherein said amount of ethylene glycol monobutyl ether is from about 0.01 to about 10 parts by weight per 100 parts by weight of the phase-change material for which said sodium sulfate decahydrate is the solid form.

* * * * *